(12) United States Patent
Ceysson et al.

(10) Patent No.: US 10,129,968 B2
(45) Date of Patent: Nov. 13, 2018

(54) ELECTRO-CONDUCTING TILE OR FLOORBOARD FLOOR COVERING

(71) Applicant: GERFLOR, Villeurbanne (FR)

(72) Inventors: Olivier Ceysson, Bollene (FR); Aurélien Carin, Saint-Christol (FR)

(73) Assignee: GERFLOR, Villeurbanne (FR)

( * ) Notice: Subject to any disclaimer, the term of this patent is extended or adjusted under 35 U.S.C. 154(b) by 277 days.

(21) Appl. No.: 15/053,472

(22) Filed: Feb. 25, 2016

(65) Prior Publication Data

US 2016/0262249 A1    Sep. 8, 2016

(30) Foreign Application Priority Data

Mar. 2, 2015  (FR) ...................... 15 51743

(51) Int. Cl.
*H05F 3/02*  (2006.01)
*B32B 5/02*  (2006.01)
(Continued)

(52) U.S. Cl.
CPC ............... *H05F 3/025* (2013.01); *B32B 3/06* (2013.01); *B32B 5/022* (2013.01); *B32B 5/024* (2013.01); *B32B 5/028* (2013.01); *B32B 7/12* (2013.01); *B32B 27/12* (2013.01); *B32B 27/18* (2013.01); *B32B 27/20* (2013.01); *B32B 27/304* (2013.01); *E04C 1/00* (2013.01); *H01B 1/04* (2013.01); *B32B 2250/40* (2013.01); *B32B 2255/10* (2013.01); *B32B 2255/26* (2013.01); *B32B 2262/101* (2013.01); *B32B 2264/108* (2013.01); *B32B 2264/12* (2013.01);
(Continued)

(58) Field of Classification Search
USPC ................................................ 361/212, 220
See application file for complete search history.

(56) References Cited

U.S. PATENT DOCUMENTS

| 4,923,741 A * | 5/1990 | Kosmo ............. A41D 31/0027 442/187 |
| 2010/0130080 A1* | 5/2010 | Coninx ................ C09D 175/04 442/1 |

FOREIGN PATENT DOCUMENTS

| EP | 2514587 A1 | 10/2012 |
| GB | 2471318 A | 12/2010 |

(Continued)

OTHER PUBLICATIONS

Written Opinion issued in French Pat. Appl. No. FR1551743.
Search Report issued in French Pat. Appl. No. FR1551743 dated Aug. 10, 2015.

*Primary Examiner* — Danny Nguyen
(74) *Attorney, Agent, or Firm* — Marshall, Gerstein & Borun LLP

(57) ABSTRACT

A component, such as a title or a floorboard, has electro-conductive properties for producing a floor covering, or a similar system, in particular for a medium sensitive to static electricity. The component includes a stack of layers integral with one another and including successively: a wearing layer of plastic consisting of granules of conductive material spread out through the thickness of said wearing layer, a first textile reinforcing armature, a middle layer of plastic comprising granules of conductive material spread out through the thickness of said middle layer, a second textile reinforcing armature, and an under layer of plastic material consisting of granules of conductive material spread out through the thickness of said under layer.

9 Claims, 1 Drawing Sheet

(51) Int. Cl.
  *B32B 27/12* (2006.01)
  *B32B 27/18* (2006.01)
  *B32B 27/20* (2006.01)
  *B32B 27/30* (2006.01)
  *H01B 1/04* (2006.01)
  *B32B 7/12* (2006.01)
  *B32B 3/06* (2006.01)
  *E04C 1/00* (2006.01)

(52) U.S. Cl.
  CPC ..... *B32B 2307/202* (2013.01); *B32B 2307/21* (2013.01); *B32B 2307/412* (2013.01); *B32B 2307/718* (2013.01); *B32B 2307/732* (2013.01); *B32B 2307/738* (2013.01); *B32B 2419/04* (2013.01); *B32B 2471/00* (2013.01)

(56) References Cited

FOREIGN PATENT DOCUMENTS

| WO | WO-03/031135 A2 | 4/2003 |
| WO | WO-2009/118509 A1 | 10/2009 |
| WO | WO-2010/032048 A1 | 3/2010 |

\* cited by examiner

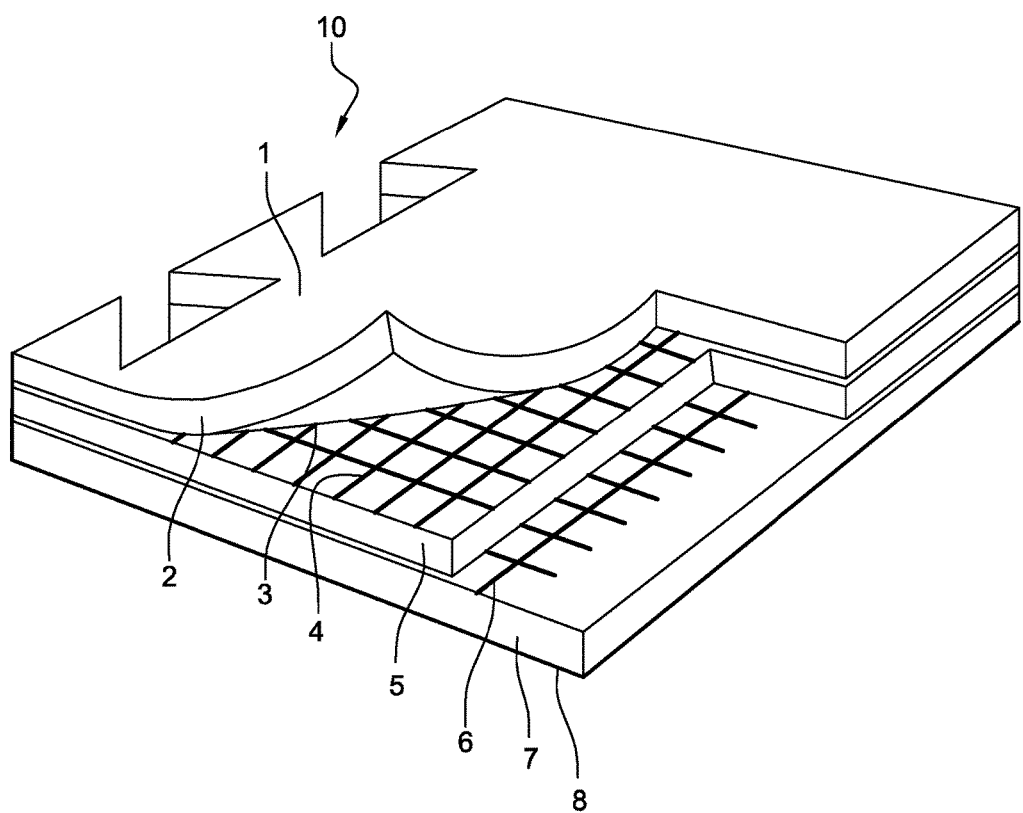

ELECTRO-CONDUCTING TILE OR FLOORBOARD FLOOR COVERING

CROSS-REFERENCE TO RELATED APPLICATIONS

This application claims the benefit of priority under 35 U.S.C. § 119 of French Patent Application No. 1551743, filed Mar. 2, 2015, the entire content of which is hereby incorporated herein by reference, in its entirety.

TECHNICAL DOMAIN

This present disclosure relates to a component, such as a tile or a floorboard, for the production of a floor covering or a similar structure, and more specifically a component having electro-conductive properties capable of evacuating electrostatic charges.

An advantageous application for the embodiments described herein will be found in the production of a floor covering conforming to the E.S.D. electrical standards, an English language acronym for Electrostatic Sensitive Devices, in particular for a medium sensitive to static electricity.

BACKGROUND OF THE DISCLOSURE

So-called E.S.D. areas are produced for the handling of sensitive electronic components, for instance, offering total absence to isolated electric charges by the use of conductive materials at every level because electrostatic discharges can generate interference or cause the failure of said electronic components.

In a known technique, there are components for the production of floor coverings, and more especially components like tiles or floorboards referred to as electro-conductive, said components being obtained for instance, by the extrusion of plastic material to form granules which are mixed with stainless steel fibres and again extruded and/or injected to form a flexible plastic material panel liable to be cut into tiles or floorboards.

The drawback of these tiles or floorboards is that are unsuitable for loose laying on the floor. They must be bonded onto the floor with an acrylic adhesive or conductive adhesive in order to form an antistatic floor covering. Beforehand, the support for said tiles or floorboards must be prepared. The dimensional stability of this type of tile or floorboard can be improved.

There is also a known way of producing conductive resins, comprising carbon black granules, to be applied directly to the floor to form an electro-conductive floor covering. However, this type of floor covering cannot be loose laid and requires the preparation of the support. What is more, the room or premises receiving the support must be locked during the resin application operation.

To obtain electro-conductive floor coverings, there is also a known way of using conductive polyvinyl chloride rolls, comprising carbon black granules. However, the drawback of these rolls is that they cannot be loose laid and require the preparation of the support. In addition, it is also necessary to lock the room containing the rolls during the laying of said rolls. The type of floor covering obtained is not removable. It is impossible to change just one tile. Finally, resistance to traffic is relatively low.

SUMMARY OF THE DISCLOSURE

One purpose of the embodiments described herein is therefore to propose a component, such as a tile or a floorboard, for producing a floor covering in ESD type environments, such as clean rooms, electronic circuit assembly rooms, hospital operating rooms etc., designed to limit the build-up of electrostatic charges, while having a structure by virtue of which it can obtain a good rating according to the grading system of the French UPEC standard, that is, wherein said component offers very good resistance to wear due to walking or passage and good resistance to punching caused by furniture feet or spike heels for instance.

Another goal of the described embodiments is to supply such an electro-conductive component offering transversal resistivity included between 104 and 106 Ohms.

Another goal of the described embodiments is to supply such a component allowing fast, easy laying and which is usable without any loss of time, and which is preferably removable.

For this purpose, a component is proposed, such as a tile or a floorboard, having electro-conductive properties for producing a floor covering, or a similar system, in particular for an area which is sensitive to static electricity. According to described embodiments, the component includes a stack of layers integral with each other and comprising in succession:

a wearing layer of plastic consisting of granules of conductive material, preferably coated in a plastic, and spread out through the thickness of said wearing layer,
a first textile reinforcing armature,
a middle layer of plastic comprising granules of conductive material spread out through the thickness of said middle layer,
a second textile reinforcing armature,
an under layer of plastic material consisting of granules of conductive material spread out through the thickness of said under layer.

By construction, this type of component is liable to offer very good resistance to wear due to walking or passage and good resistance to punching so as to qualify, for instance, for the grading U4 P3 of the UPEC French standard.

The component according to the described embodiments is also capable of obtaining the desired electro-conductive performances while preserving the mechanical performances and advantages of fast and easy laying.

Indeed, the component is capable of evacuating electrostatic charges by earthing. In particular, the electrostatic charges are conducted from the conductive wearing layer through to the conductive under layer for earthing. The component offers electro-conductive performances through its entire thickness, and continuously from one adjacent component to another.

Advantageously, and to improve the electro-conductive properties of the component, the first and/or the second reinforcing armature(s) is (are) coated with a conductive binder, preferably in a quantity included between 2 and 50 g/m2.

The conductive binder contains a quantity of carbon black included between 30% and 80% by weight.

According to one specific embodiment, the granules of conductive material in the wearing layer and/or the middle layer and/or the under layer are granules of carbon black.

Advantageously, the wearing layer includes between 4% and 10% by weight of conductive granules containing between 15% and 25% by weight of carbon black, in order to offer transversal resistivity included between 104 and 106 Ohms.

Advantageously, the first and/or second reinforcing armatures are coated with carbon black in a quantity included between 30% and 80% by weight, in order to offer surface resistivity of less than 5.104 Ohms.

Advantageously, the middle layer and the under layer include between 8% and 25% by weight of conductive granules containing between 20% and 35% by weight of the carbon black, in order to offer transversal resistivity of less than 105 Ohms.

Advantageously, the wearing layer is coated on at least one of its faces, or on both, with a layer of conductive varnish.

Preferably, the under layer is also coated, on its underside, with a layer of conductive varnish.

BRIEF DESCRIPTION OF DRAWINGS

Other advantages and characteristics will be better understood from the description which will follow of several alternative embodiments given as non-limiting examples, on the basis of the sole FIG. 1 illustrating a portion of the component, more particularly a tile portion for instance, as a transversal section.

DETAILED DESCRIPTION

The present description concerns a component (10), such as a tile or a floorboard, having electro-conductive properties for producing a floor covering, in particular for a medium which is sensitive to static electricity.

The component (10) is, preferably, a parallelepiped and comprises a stack of layers made integral with one another. The various layers are bound to one another, for instance, by hot pressing, or by any other appropriate technique well known to the skilled person.

The component (10) includes a wearing layer (2) of plastic material such as polyvinylchloride. This wearing layer (2) is preferably 2 mm thick and includes granules of conductive material, such as carbon black, preferably but not limitingly coated in a plastic material, more particularly polyvinyl chloride, and spread out through the thickness of said wearing layer (2) so as to conduct the static electricity from its upper face through to its lower face. Preferably, and to fulfill, for instance, the requirements of the U4 P3 rating of the UPEC French standard, the wearing layer (2) has density included between 1.4 and 1.6, persistent depression of less than 0.10 mm, and castor chair resistance of 25000 cycles.

According to one particular embodiment, the wearing layer (2) contains between 4% and 10% by weight of conductive granules. These conductive granules contain between 15% and 25% carbon black so that the wearing layer (2) offers transversal resistivity included between 104 and 106 Ohms. Preferably, the coated conductive granules have diameters included between 2.5 and 4 mm and lengths included between 4 and 6 mm. Advantageously, said conductive wearing layer (2) is given polyurethane surface treatment to facilitate maintenance. To improve even more the conductive properties of electrostatic charges, said wearing layer (2) is coated, on at least one of its faces, or on both, with a thin layer of conductive varnish (1, 3), with thickness included, for instance, between 2 and 50 μm. For instance, the layer of varnish (1) applied to the front face of the wearing layer, intended in particular to form the surface layer of the component (10), is, preferably, transparent and is made up of a mixture of resin of the urethane-acrylate type and of conductive particles. The varnish (1) can be a photo-polymerizable varnish for instance. The varnish can be polymerized in a conventional way; that is by means of polychromatic UV transmitters but also by means of an excimer laser type monochromatic laser transmitter.

The layer of varnish (3) applied to the back of the wearing layer (2) is a varnish consisting of a mixture of acrylic resins (10% to 20%) and of carbon black (10% to 20%) dispersed in a water-alcohol solution.

The varnish is applied, for instance, using a roller varnishing device then dried by infrared wave emission and by airflows to obtain a layer of varnish (1) forming a continuous touch-dry film. The amount of varnish is included between 25 and 40 g/m$^2$ in the wet state, that is between 7.5 and 16 g/m$^2$ in the dry state.

The component (10) then includes, in contact with the lower face of the wearing layer (2) or with the layer of conductive varnish (3), a first reinforcing armature (4) of textile, for instance in the form of a mesh or a grid of textile yarns of negligible thickness, or a film of glass. The textile yarns of said first reinforcing armature (4) are, preferably, spaced 3 mm from one another in the longitudinal and transversal directions and have a linear weight included between 34 and 136 g/m, and advantageously of 68 g/m.

According to one particular embodiment, said first reinforcing armature (4) is coated with a conductive binder, such as polyvinyl alcohol in a quantity included between 2 and 50 g/m2 for instance and including carbon black in a quantity included to between 30% and 80% by weight. Accordingly, the first textile reinforcing armature (4) also has properties of conducting electrostatic charges and offers a surface resistivity of less than 5.104 Ohms.

The following layer of the component (10) consists of a middle layer (5) of plastic material, such as polyvinylchloride, preferably to a thickness of 2 mm and also containing granules of conductive material, such as carbon black granules spread out through the thickness of said middle layer (5) to ensure the continuity of the electrostatic charge conductive properties. Preferably, said middle layer (5) includes between 8% and 25% by weight of conductive granules. These conductive granules contain between 20% and 35% by weight of carbon black so that said middle layer (5) has transversal resistivity of less than 105 Ohms. Preferably, the conductive granules have diameters included between 1 and 4 mm, and lengths included between 0.5 and 3.5 mm. In addition, the resistance of the pressed granules is included between 101 and 106 Ohms, and notably, more specifically between 102 and 103 Ohms. Preferably, and to fulfill the requirements, for instance, of the U4 P3 rating of the UPEC French Standard, the middle layer (5) has Shore A hardness included between 80 and 95.

The component (10) then includes a second reinforcing armature (6), similar to the first reinforcing armature (4) for instance, in the form of a mesh or a grid of textile yarns of negligible thickness, or a film of glass. The textile yarns of said second reinforcing armature (6) are preferably, spaced 3 mm from one another in the longitudinal and transversal directions and have a linear weight included between 34 and 136 g/m, and advantageously of 68 g/m.

In the same way as for the first reinforcing armature (4), said second reinforcing armature (6) is coated with a conductive binder, such as polyvinyl alcohol in a quantity included between 2 and 50 g/m2 for instance and including carbon black in a quantity included to between 30% and 80% by weight. Accordingly, the second textile reinforcing armature (6) also has properties of conducting electrostatic charges and offers a surface resistivity of less than 5.104 Ohms.

The following layer of the component (10) consists of an under layer (7) of plastic material, similar to the middle layer (5). Indeed, said under layer (7) is, for instance, made of polyvinylchloride and includes, preferably, a thickness of 2 mm. The under layer (7) also contains granules of conductive material, such as carbon black granules, spread out through the thickness of said under layer (7) to ensure the continuity of the conductive properties of electrostatic charges, in particular through to earth. Preferably, said under layer (7) includes between 8% and 25% by weight of conductive granules. These conductive granules contain between 20% and 35% by weight of carbon black so that said under layer (7) also has transversal resistivity of less than 105 Ohms. Preferably, the conductive granules have diameters included between 1 and 4 mm, and lengths included between 0.5 and 3.5 mm. In addition, the resistance of the pressed granules is included between 101 and 106 Ohms, and notably, more specifically between 102 and 103 Ohms. Preferably, and to fulfill the requirements, for instance, of the U4 P3 rating of the UPEC French Standard, the under layer (7) has a Shore A hardness included between 80 and 95.

Advantageously, and to improve the electro-conductive properties of the component (10), on its reverse side, that is the underside of under layer (7), it has a thin layer of conductive varnish (8), comprising a mixture of acrylic resins (10% to 20%) and of carbon black (10% to 20%) dispersed in a water-alcohol solution.

This type of component (10), such as a tile or a floorboard, therefore, allows a floor covering to be obtained which, through its particular structure, can be claimed to have an U4 P3 rating according to the UPEC French standard. Said component (10), in addition, limits the build-up and ensures the evacuation of electrostatic charges by earthing in areas sensitive to static electricity, such as the rooms for the production of electronic, IT or telecom equipment, clean rooms, electronic circuit assembly rooms, hospital operating rooms, etc.

The component (10) described here has transverse resistivity included between 104 and 106 Ohms, thus fulfilling the requirements of standards EN 1081, IEC 61340, ESD 7.1., ASTM F150 relative to ESD type environments. The component (10) described here also has a load potential level fulfilling the requirements of standard EN1815.

By construction, the component (10), such as a tile or a floorboard, is of the "loose lay" and removable type, that is, not requiring final bonding to the support because said component (10) is sufficiently rigid and has a weight (for instance between 8 and 11 kg/m², securely holding it in place. Laying is fast, easy and the floor can be used immediately.

This type of removable component (10) is suitable for heavy traffic areas. These components (10) combine speedy laying, strength, and modularity.

The removable "loose lay" components (10) do not necessarily require the prior preparation of the support. The components (10) must, in particular, be compressed laterally to prevent them moving and to prevent the joints from opening.

The described embodiments can be adapted to every type of floor covering component (10) such as tiles or floorboards in the shape of parallelograms, with straight edges, without any means of assembly between one another, or, for instance, using assembly means such as dovetails.

Whatever the type of components (10), the described embodiments adapt to different types of laying methods for the components (10), such as loose laying or loose laying with adhesive, welded and/or bonded laying.

What is claimed is:

1. A floor covering component having electro-conductive properties, the floor covering component comprising:
   a stack of layers integral with one another and including:
   a wearing layer of plastic comprising granules of conductive material spread out through the thickness of said wearing layer;
   a first textile reinforcing armature;
   a middle layer of plastic comprising granules of conductive material spread out through the thickness of said middle layer;
   a second textile reinforcing armature; and
   an under layer of plastic material comprising granules of conductive material spread out through the thickness of said under layer.

2. A floor covering component according to claim 1, wherein said first and/or second reinforcing armature are coated with a conductive binder.

3. A floor covering component according to claim 2, wherein the first and/or second reinforcing armatures are coated in a conductive binder in a quantity included between 2 and 50 g/m2.

4. A floor covering component according to claim 3, wherein the conductive binder contains carbon black in a quantity included between 30% and 80% by weight.

5. A floor covering component according to claim 1, wherein the granules of conductive material in the wearing layer and/or the middle layer and the under layer are granules of carbon black.

6. A floor covering component according to claim 5, wherein the wearing layer includes between 4% and 10% by weight of conductive granules, which conductive granules contain between 15% and 25% by weight of carbon black.

7. A floor covering component according to claim 5, wherein the middle layer and the under layer comprise between 8% and 25% by weight of conductive granules, which conductive granules contain between 20% and 35% by weight of carbon black.

8. A floor covering component according to claim 1, wherein the wearing layer is aligned on at least one of its faces, or on both, with a layer of conductive varnish.

9. A floor covering component according to claim 1, wherein the under layer is coated, on the reverse side, with a layer of conductive varnish.

* * * * *